Nov. 20, 1951  J. D. JACKSON  2,575,418
TURN SIGNAL FOR VEHICLES
Filed Dec. 2, 1949
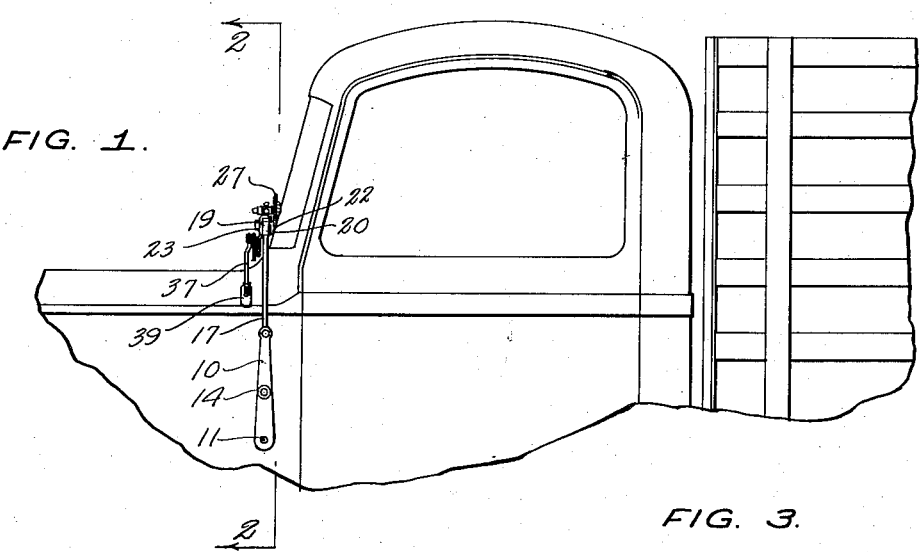
FIG. 1.
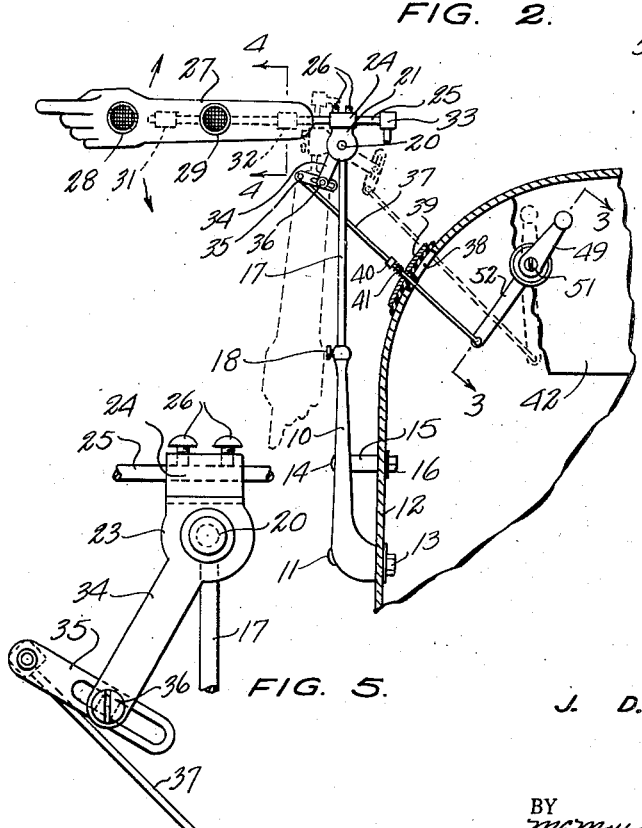
FIG. 2.
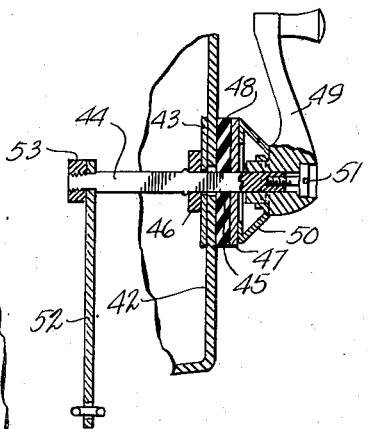
FIG. 3.
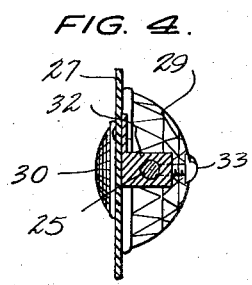
FIG. 4.
FIG. 5.
INVENTOR
J. D. JACKSON,
BY
McMorrow, Berman & Davidson
ATTORNEYS Patented Nov. 20, 1951

2,575,418

UNITED STATES PATENT OFFICE 2,575,418

TURN SIGNAL FOR VEHICLES

J. D. Jackson, Eloy, Ariz.

Application December 2, 1949, Serial No. 130,697

2 Claims. (Cl. 116—52)

1

This invention relates to turn signals for vehicles and more particularly to a turn signal for automotive vehicles, such as automobiles and trucks.

It is among the objects of the invention to provide a turn signal mountable on the exterior of a vehicle and having operating means disposed within the vehicle so that the signal can be moved to different indicating positions by the vehicle driver from within the vehicle and without having to open a vehicle window or expose himself to drafts or atmospheric precipitation; which signal is of large size and easily visible both in daylight and at night and can be mounted on an existing vehicle with no material modification of the vehicle structure, which has operating means mountable on the vehicle dash or instrument panel in convenient reach of the driver, and which is simple and durable in construction, economical to manufacture, easy to use, and neat and attractive in appearance.

Other objects and advantages will become apparent from a consideration of the following description and the appended claims in conjunction with the accompanying drawing wherein:

Figure 1 is a side elevation of a fragmentary portion of an automotive vehicle showing a turn signal device illustrative of the invention operatively mounted thereon.

Figure 2 is a cross section on a somewhat enlarged scale on the line 2—2 of Figure 1 looking in the direction of the arrows.

Figure 3 is a cross section on a further enlarged scale on the line 3—3 of Figure 2.

Figure 4 is a cross section on an enlarged scale on the line 4—4 of Figure 2, and Figure 5 is an elevation of a fragmentary portion of the turn signal device illustrating structural features of the device.

With continued reference to the drawing, the improved turn signal device includes a standard 10 attachable to a vehicle for upright disposition on the outside of the vehicle below the vehicle windshield, as clearly illustrated in Figure 1. This standard may taper from its lower to its upper end and have its lower end angularly disposed to receive a bolt 11 which extends through the standard near the lower end of the latter and through an aperture in the vehicle wall 12 and has a nut 13 threaded thereon within the vehicle to rigidly secure the lower end of the standard 10 to the vehicle. A second bolt 14 extends through the standard and through the vehicle wall 12 at a location above the bolt 11 and a tubular spacer sleeve 15 surrounds the bolt 14

2 between the standard and the outer side of the vehicle wall 12 to space the standard outwardly from the vehicle wall, a nut 16 being threaded onto the bolt 14 within the vehicle to rigidly clamp the standard at this location to the wall of the vehicle. The standard 10 has a bore extending longitudinally thereof from its smaller or upper end and a slender post 17 is slidably mounted in the bore of the standard 10 and extends upwardly from the standard. A set screw 18 is threaded through a screw threaded aperture in the standard near the upper end of the latter and engages the post 17 to lock the post in adjusted position relative to the standard against both longitudinal and rotational movements.

At its upper end the post 17 is provided with an eye 19 and a pivot pin 20 extends through this eye and is journaled therein.

A bracket 21 has two spaced apart legs 22 and 23 each provided with an aperture and these apertures receive the pin 20 at the respectively opposite sides of the eye 19 on the post 17 to rotatably mount the bracket on the upper end of the post. The pin has on one end a head bearing against one of these legs and on its other end a nut or washer bearing against the other leg to retain the pin in operative association with the bracket 21 and post 17. A lug 24 is secured to the bracket arms 22 and 23 and has an aperture extending longitudinally therethrough. A bar 25 extends slidably through the aperture in the lug 24 and is locked in adjusted position in the lug by the set screws 26 and a semaphore arm 27 is secured onto the bar 25 at the side of the bracket 21 remote from the vehicle.

When the signal device is operatively mounted on a vehicle the axis of the pivotal connection between the bracket 21 and the post 17 is substantially horizontal and extends longitudinally of the vehicle so that the semaphore arm 27 is angularly movable in a substantially vertical plane extending outwardly of the vehicle from the post 17 and standard 10 and substantially perpendicular to the longitudinal center line of the vehicle.

This arm 27 is a flat, thin-walled body having its major surfaces substantially vertically disposed and having a length and width sufficient to render it easily visible either in daylight or at night. It may be suitably colored or coated to increase the visibility thereof and may be equipped with visual indicators such as the light reflectors 28 and 29 mounted on the rear side of the semaphore arm and the light reflector 30 mounted on the forward side of this arm. Two apertured blocks 31 and 32 are secured on one side of the arm and slidably receive the rod 25, the arm being secured in adjusted position on the rod by suitable set screws extending through screw threaded apertures in the blocks and bearing against the bar.

The arm may have an inoperative position in which it depends adjacent the post 17 and standard 10, as indicated in broken lines in Figure 2, and three operative positions in one of which it is inclined outwardly and downwardly from the post to indicate a left turn of the vehicle, in another of which it extends substantially horizontally outward from the top end of the post to indicate a stop of the vehicle and in the third of which it extends upwardly from the top of the post to indicate a right turn.

A limit stop abutment 33 is secured on the end of bar 25 at the side of the bracket 21 opposite the semaphore arm 27 and contacts the side of the post 17 when the semaphore arm is in its uppermost position to limit upward movement of the semaphore arm about its pivotal connection with the upper end of the post 17.

A lever arm 34 extends from one of the legs 22 or 23 radially of the pivot pin 20 downwardly from the bracket and nearly at right angles to the bar 25. As illustrated, the angle between the arm 34 and the portion of the bar 25 carrying the semaphore arm 27 is less than the angle between the lever arm 34 and the portion of the bar carrying the limit stop member 33 but these angles are within ten or fifteen degrees of being right angles.

A slotted link 35 is adjustably secured to the distal end of the lever arm 37 by a screw 36 which extends through a longitudinally elongated slot in the link 35 and through an aperture in the lever arm 34 near the outer or distal end of the latter. This link 35 is provided near one end with an aperture and a connecting rod 37 has at one end an upset portion pivotally secured in the aperture near the one end of the link 35.

The connecting rod 37 extends through an opening 38 made in the wall of the vehicle adjacent the bottom edge of the vehicle windshield and a sealing pad 39 is mounted on the outer surface of the vehicle wall and has an aperture therethrough slidably receiving the connecting rod 37. The opening 38 in the vehicle wall is elongated in a generally vertical direction to accommodate lateral movement of the connecting rod 37 and the sealing pad 39 is slidable on the outer surface of the vehicle wall longitudinally of this opening 38. A spring abutment 40 is secured on the rod at a location spaced outwardly from the pad 39 and a compression spring 41 between this abutment and the pad maintains the pad in sealing engagement with the outer surface of the wall of the vehicle cowl in which the opening 38 is provided.

The vehicle dash or instrument board 42 is provided with an aperture 43 adjacent its end at the side of the vehicle at which the turn signal device is mounted and a shaft 44 extends through the aperture 43 from the inner to the outer side of the vehicle instrument board or instrument panel 42. The shaft 44 is journaled in a bearing sleeve 45 which is received in the aperture 43. A washer 46 secured on the shaft provides an abutment for one end of this bearing sleeve and a washer 47 surrounding the shaft bears against the opposite end of the bearing sleeve, a pad 48 of resilient material being interposed between the washer 47 and the outer side of the vehicle instrument panel 42. A hand crank 49 is secured on the shaft 44 at the outer side of the instrument panel 42 and a spacer 50 is interposed between this crank and the washer 47. The crank is secured on the shaft by a screw 51 which extends through the shaft receiving aperture in the crank and is threaded into a screw threaded well in the corresponding end of the shaft. When this screw is tightened it applies pressure to the resilient pad 48 through the spacer 50 and washer 47 so that the shaft 44 is firmly journaled in the instrument panel of the vehicle.

A lever arm 52 is secured at one end to the shaft 47 at the end of the shaft at the inner side of the instrument panel by a nut 53 threaded onto the shaft and the connecting rod 37 is pivotally connected to the outer or distal end of the lever arm 52.

With this construction rotation of the crank 49 will rotatably move the lever arm 52 and this lever arm through the intermediacy of the connecting rod 37 will swing the semaphore arm 27 to the various positions described above.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A turn signal for a vehicle comprising a standard attachable to a vehicle for disposition in substantially upright position on the outside of the vehicle below the vehicle windshield, said standard having a bore extending downwardly from the upper end thereof, a post slidably received in the bore of said standard and extending upwardly from the latter, means locking said post in adjusted position relative to said standard, a bracket journaled on the upper end of said post for rotational movements about an axis substantially perpendicular to the longitudinal center line of said post, a semaphore arm secured at one end to said bracket and extending outwardly from one side of the latter, a limit stop member carried by said bracket at the side thereof opposite said semaphore arm and engageable with said post to limit upward movement of said arm to a substantially vertical position, a lever arm extending radially from said bracket nearly at right angles to said semaphore arm, a shaft rotatably mountable on the instrument panel of the vehicle, a hand crank on said shaft at the outer side of the instrument panel, a lever arm secured on the opposite end of said shaft and extending radially thereof, and a link connecting said lever arms and slidably extendable through a vehicle wall.

2. A turn signal device for a vehicle comprising a standard attachable to a vehicle for disposition in upright position on the outside of the vehicle below the vehicle windshield, said standard having a bore extending longitudinally thereof from its upper end, a post slidably received in the bore of said standard and extending upwardly from the latter, a bracket journaled on the upper end of said post for rotational movements about an axis substantially perpendicular to the longitudinal center line of the post, a bar secured to said bracket and extending to respectively opposite sides of the latter, a semaphore arm secured to said bar at one side of said bracket, a limit stop member secured to said bar at the opposite side of said bracket and engageable with said post to limit angular movements of said semaphore arm about the pivotal connection between said bracket and said post to a substantially vertical position, a lever arm extending radially from said bracket, a slotted link adjustably secured to the distal end of said lever arm, a shaft rotatably mountable on the instrument panel of the vehicle, a hand crank secured on said shaft at the outer end of the instrument panel, a lever arm secured on the opposite end of said shaft and extending radially therefrom, and a connecting rod pivotally connected at one end to said link at one end of the latter and pivotally connected at its opposite end to said last mentioned lever arm at the distal end of the latter.

J. D. JACKSON.

REFERENCES CITED

The following references are of record in the file of this patent:

UNITED STATES PATENTS

| Number | Name | Date |
|---|---|---|
| 1,124,497 | Menrad et al. | Jan. 12, 1915 |
| 1,311,418 | Rowling | July 29, 1919 |
| 1,864,062 | Goodin | June 21, 1932 |